July 24, 1951 E. J. STACHURA 2,561,425

BALANCED PUSH-PULL AMPLIFIER

Filed June 30, 1949

Inventor

Edward J. Stachura

Patented July 24, 1951 2,561,425

UNITED STATES PATENT OFFICE 2,561,425

BALANCED PUSH-PULL AMPLIFIER

Edward J. Stachura, Arlington, Va.

Application June 30, 1949, Serial No. 102,181

5 Claims. (Cl. 179—171)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates to electron discharge tube circuits and particularly to amplifier circuits.

A principal object of the invention is to provide an amplifier which may be used for the amplification of direct current or alternating current signal inputs.

A still further object of this invention is to provide a novel push-pull amplifier which does not invert the phase of the signal being amplified.

It is also an object of this invention to provide a balanced amplifier which has the advantage of greatly improved response over a wide range of frequencies and a reduction in the number of coupling elements required.

A feature of this invention relates to a balanced amplifier wherein the anodes of one pair of tubes are directly connected to the cathodes of a second pair of tubes and wherein the input signal is applied to the grid circuit of all tubes.

A further feature of the invention relates to a balanced amplifier wherein the output is obtained from across a pair of tubes which serve as degenerative circuit elements for a second pair of tubes.

Other objects, features and advantages of this invention not specifically enumerated will suggest themselves to those skilled in the art and will become apparent from the following detailed specification taken in conjunction with the accompanying drawings, wherein like reference characters represent like parts, and wherein.

Figure 1:
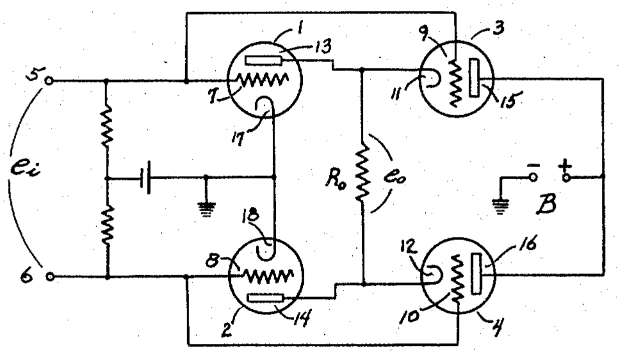
Figure 1 is a simplified schematic diagram of an amplifier circuit arrangement in accordance with the invention.

Referring now more particularly to Figure 1 there is shown schematically a circuit including four amplifier tubes 1, 2, 3 and 4. The tubes shown are of the triode type but may be of any of the well-known multi-grid types. An input signal $e_i$ is applied to terminals 5 and 6 from which it is fed to grids 7 and 8 of tubes 1 and 2, respectively, and to grids 9 and 10 of tubes 3 and 4, respectively; anode 15 of tube 1 is connected directly to cathode 11 of tube 3, and anode 16 of tube 2 is connected directly to cathode 12 of tube 4. Anodes 17 and 18 of tubes 3 and 4, respectively, are connected to the positive terminal of voltage source B. The negative terminal of the voltage source B is connected to ground. An output load circuit $R_0$ is connected to anodes 15 and 16 of tubes 1 and 2, respectively.

Figure 2:
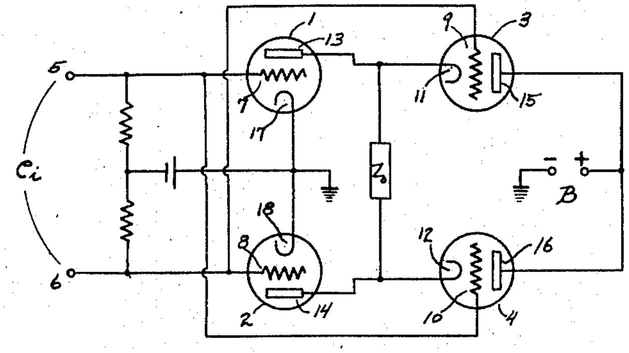
Figure 2 is a view similar to Figure 1, representing a modification of an amplifier in accordance with the invention.

Figure 2 differs from Figure 1 only in the respect that the grid 9 of tube 3 is connected to grid 8 of tube 2, and that the grid 10 of tube 4 is connected to grid 7 of tube 1. Thus a signal of one phase applied to tubes 1 and 2 will appear across tubes 3 and 4 in opposite phase. In Figure 2 the load circuit is represented by block $Z_0$.

Tubes 1, 2, 3 and 4 as shown in Figures 1 and 2 are assumed to be of similar types for the purposes of the following description. In some applications, however, it may be desirable to utilize tubes of one type for 1 and 2, and tubes of a different type for tubes 3 and 4.

Referring now to Figure 1 it will be seen that with $e_i=0$, and assuming for the moment that $R_0$ has an infinite resistance, an anode current will flow from cathode 17 to anode 13 of tube 1, through tube 3 from cathode 11 to anode 15, through B and back to cathode 17. In a similar manner an equal anode current will flow from cathode 18 to anode 14 of tube 2 to cathode 12 of tube 4 to anode 16, through B and back to cathode 18. Since the circuit of Figure 1 is assumed to be balanced with tubes having similar characteristics, the internal tube drop, that is, the $i_pr_p$ for each tube will be equal. Thus under the condition of no signal input, no voltage difference will exist between the points to which $R_0$ is connected. Further, it should be noted that the plate resistance of tube 1 is in the cathode return circuit of tube 3, and that the plate resistance of tube 2 is in the cathode return circuit of tube 4.

In the operation of the above-described circuit when the input voltage $e_i$ is such as will cause a positive voltage to appear at terminal 5 and a negative voltage at terminal 6, grids 7 and 9 of tubes 1 and 3, respectively, will swing positive, while the grids 8 and 12 of tubes 2 and 4, respectively, will swing negative. This causes the cathode-to-plate resistance of tubes 1 and 3 to decrease, resulting in an increase in anode current through these tubes. Simultaneously, the cathode-to-plate resistance of tubes 2 and 4 is increased resulting in a decrease in anode current through these tubes. Thus the voltage drop across tube 2 will exceed the voltage drop across tube 1, unbalancing the circuit with the result that a potential difference exists between the points to which the load resistor $R_0$ is connected. This voltage differential will vary in magnitude and direction in accordance with variation in the input signal. Assuming now that $R_0$ has some finite value of resistance, it will be apparent that, under the conditions assumed above, a current will flow through $R_0$ from a point of higher voltage, anode 14, to a point of lower voltage, anode 13, producing a voltage drop across $R_0$ which is positive at the point connected to anode 13, and negative at the other end. Accordingly, the phase of the output voltage variations is the same as the phase of the input voltage variations.

Figure 3:
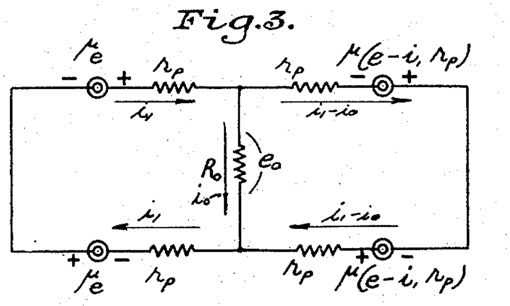
Figure 3 is an equivalent circuit diagram of Figure 1.

To better understand the operation of the circuit of Figure 1, reference will now be made to Figure 3, which is an equivalent circuit of Figure 1. $\mu e_1$ is the equivalent voltage in the plate circuit of tubes 1 and 2 and is the product of the input voltage $e_i$ and the amplification factor $\mu$ of the tubes. $r_p$ is the plate resistance of tubes 1, 2, 3 and 4. $i_1$ and $i_2$ are the currents flowing in the circuits as a result of the applied voltage $e_i$. Since the voltage appearing between the cathode and grid of tubes 3 and 4 is less than the input voltage $e_i$ by the amount of $i_1 r_p$ drop in tubes 1 and 2, the equivalent voltage in the plate circuits of tubes 3 and 4 is represented by the term $\mu(e_i - i_1 r_p)$. The polarities of the applied voltage and the current directions as indicated in Figure 3 are assumed for purposes of analysis. The circuit of Figure 3 is in accordance with well-known methods of analysis of vacuum tubes by equivalent circuits and may be found fully treated in "Theory and Application of Electron Tubes" by H. J. Reich, pages 87 to 97, McGraw-Hill Book Co., Inc., New York, N. Y., 1944.

Using Kirchhoff's law:

$$(1)\qquad 2\mu e - 2i_1 r_p - i_0 R_0 = 0$$

and $$(2)\qquad i_0 R_0 - 2(i_1 - i_0) r_p + 2\mu(e - i_1 r_p) = 0$$

From (1)

$$(3)\qquad i_1 = \frac{\mu e}{r_p} - \frac{i_0 R_0}{2r_p}$$

Rewriting (2)

$$(4)\qquad i_0(2R_0 + 2r_p + \mu R_0) = 2\mu^2 e$$

and $$i_0 = \frac{2\mu^2 e}{2R_0 + 2r_p + \mu R_0} = \frac{2\mu^2 e}{R_0(2+\mu) + 2r_p}$$

$$(5)\qquad e_0 = i_0 R_0 = \frac{2\mu^2 e}{(\mu+2) + \frac{2r_p}{R_0}}$$

The voltage amplification of an amplifier, $A_v$, is by definition:

$$(6)\qquad 1A_v = \frac{e_0}{e_i} = \frac{2\mu^2}{(\mu+2) + \frac{2r_p}{R_0}}$$

Referring now to Figure 2, and assuming that $Z_0 = R_0$, the equivalent circuit diagram would be that of Figure 3 with the term $\mu(e - i_1 r_p)$ being of opposite sign to that for Figure 1. Thus, using the above procedure, $$(7)\qquad 2\mu e - 2i_1 r_p - i_0 R_0) = 0$$

and $$(8)\qquad i_0 R_0 - 2(i_1 - i_0) r_p - 2\mu(e - i_1 r_p) = 0$$

$$(9)\qquad 2A_v = \frac{2\mu}{1 + \frac{2r_p}{(\mu-2) R_0}}$$

It is well known that the voltage amplification of a conventional push-pull amplifier having a resistive output circuit is:

$$(10)\qquad A_v = \frac{\mu}{1 + \frac{r_p}{R_0}}$$

for one stage, and $$(11)\qquad 3A_v = \left(\frac{\mu}{1 + \frac{r_p}{R_0}}\right)^2$$

for two stages.

Since the circuits shown in Figures 1 and 2 are in effect two push-pull stages of amplification, a comparison of the voltage amplification can be made with that of the conventional type represented by Equation 11. The table illustrates the manner of variation of the voltage amplification with variation of output load resistance as determined from Equations 6, 9 and 11. For purposes of comparison a value of 30 has been assumed for $\mu$.

*Table*

| $R_0$ | Voltage Amplification | | |
|---|---|---|---|
| | (6) | (9) | (11) |
| $\infty$ | 56 | 60 | 900 |
| $2r_p$ | 54.5 | 58 | 440 |
| $r_p$ | 53 | 56 | 225 |
| $\frac{r_p}{2}$ | 50 | 52.5 | 100 |
| $\frac{r_p}{4}$ | 45 | 46.6 | 36 |

The table shows that while the gain of the amplifier in accordance with the invention is, under most conditions, less than that of conventional types, the gain is substantially constant for varying loads. That is, an appreciable variation in load impedance has little or no effect on the gain of the amplifier, whereas similar variations in load impedance in the case of conventional circuits have an appreciable effect on the gain of the amplifier. This is particularly important when the load impedance $Z_0$ is a function of frequency. In the amplifier of the invention substantially no frequency distortion takes place due to variations in load impedance.

A further advantage of the amplifiers of Figures 1 and 2 is their lower output impedance. Using well-known methods of calculation (see particularly articles: Cathode follower calculations, Electronics, page 137, McGraw-Hill, October 1944, New York, N. Y.; and "The cathode follower," Radio News, February 1945, pages 54, 55), the output impedance of amplifiers in accordance with Figures 1 and 2 was found to be:

$$Z = \frac{2r_p}{\mu} = \frac{2}{G_m}$$

where $G_m$ is the mutual conductance of tubes used.

While the above circuits are forms of cathode followers, they have the advantage over the conventional circuits in that the gain is appreciably higher. That is, a single cathode follower stage has a gain of less than unity, and if coupled to a resistance-coupled amplifier stage wherein the tube has an amplification factor of 30, the overall gain cannot exceed 30, in most cases being appreciably less.

As previously pointed out tubes 1 and 2 may be of one type and tubes 3 and 4 may be of another type. In some applications pentode or other type of multi-grid tube might be used for tubes 1 and 2. While the use of tubes operated as constant current degenerative circuit elements in cathode follower circuits is not new and may be found described in "Vacuum Tube Amplifiers" by Valley and Wallman, Radiation Laboratory Series, chap. 11, particularly pages 430 to 441, McGraw-Hill Book Co., New York, N. Y., 1948; it is emphasized that the arrangement of tubes, the method of introducing the signal to the grids, and other features of the present invention constitute a definite advance over degenerative amplifiers heretofore used or known.

While certain embodiments of the invention have been described by way of illustration, it will be understood that the invention is not limited thereto and that various changes and modifications may be made without departing from the spirit and scope of the invention as defined by the following claims.

I claim:

1. An amplifier comprising a first set of tubes and a second set of tubes, each having at least a cathode, a grid and an anode, means for impressing a signal to be amplified between the grids of said first set of tubes, means connecting the grid of each tube in said second set to a grid of a respective tube of said first set, means connecting the cathode of each of said second set of tubes to the anode of respective tubes of said first set of tubes, the second set of tubes having their anodes connected together, a source of energy connected between the anodes of said second set of tubes and the cathodes of said first set of tubes, and a load circuit connected between the anodes of said first set of tubes.

2. A degenerative balanced amplifier circuit comprising a first pair of tubes each having at least a cathode, a grid and an anode, a second pair of tubes each having at least a cathode, a grid and an anode, input means connected to the grids of said first pair of tubes whereby said grids are excited in opposite phase by an input signal, means connecting the anode of one of said first pair of tubes to the cathode of one of said second pair of tubes, means connecting the anode of the other of said first pair of tubes to the cathode of the other of said second pair of tubes, means connecting the grid of one of said first pair of tubes to the grid of one of said second pair of tubes, means for connecting the grid of the other of said second pair of tubes to the grid of the other of said first pair of tubes, a load impedance connected across the anodes of the first pair of tubes, a source of anode potential for said tubes, means connecting the anodes of the said second pair of tubes to the positive terminal of said source of anode potential, and means for connecting the negative terminal of said source of anode potential to the cathodes of said first pair of tubes.

3. An amplifier comprising a first pair of tubes each having at least a cathode, a grid and an anode, a second pair of tubes each having at least a cathode, a grid and an anode, an input circuit connected across the grids of said first pair of tubes and the grids of said second pair of tubes, means connecting the anodes of one of said first pair of tubes to the cathode of one of said other pair of tubes, means connecting the anode of the other of said first pair of tubes to the cathode of the other of said second pair of tubes, a load circuit connected between the anodes of said first pair of tubes, a source of anode potential, means connecting the anodes of said second pair of tubes to the positive terminal of said source of anode potential, and means connecting the cathodes of said first pair of tubes to the negative terminal of said source of anode potential.

4. An amplifier comprising a first, second, third and fourth tube, each having at least a cathode, a grid and an anode, input terminals to said amplifier, means for connecting the grids of the first and third tubes to one of said terminals, means connecting the grids of the second and fourth tubes to the other of said terminals; a source of anode potential for said tubes, means connecting the cathodes and anodes of the first and third tubes to said source whereby anode current flowing through second tube also flows through said first tube, means connecting the cathodes and anodes of the third and fourth tubes to said source whereby the anode current flowing through said fourth tube also flows through said third tube; and a load circuit connected between the anodes of said second and third tubes.

5. An amplifier comprising a first set of tubes and a second set of tubes, each tube having at least a cathode, a grid and an anode, means for impressing a signal to be amplified between the grids of said first set of tubes, direct connecting means between the grid of each tube in the second set to a grid of a respective tube of the first set, and direct connecting means connecting the cathode of each of said second set of tubes to the anode of respective tubes of said first set of tubes, the second set of tubes having their anodes connected together, a source of energy connected between the anodes of said second set of tubes and the cathodes of said first set of tubes, and a load circuit connected between the anodes of said first set of tubes.

EDWARD J. STACHURA.

REFERENCES CITED

The following references are of record in the file of this patent:

UNITED STATES PATENTS

| Number | Name | Date |
|---|---|---|
| 2,235,677 | Gubin | Mar. 18, 1941 |
| 2,424,893 | Mansford | July 29, 1947 |
| 2,428,295 | Scantlebury | Sept. 30, 1947 |

FOREIGN PATENTS

| Number | Country | Date |
|---|---|---|
| 345,739 | Italy | Jan. 14, 1937 |